United States Patent
Tumavicus

[11] 3,972,349
[45] Aug. 3, 1976

[54] VARIABLE RATIO BYPASS GAS TURBINE ENGINE WITH FLOW DIVERTER

[75] Inventor: Julius W. Tumavicus, Old Saybrook, Conn.

[73] Assignee: United Technologies Corporation, Hartford, Conn.

[22] Filed: June 20, 1974

[21] Appl. No.: 481,439

[52] U.S. Cl. .............................. 137/609; 137/612; 415/153 A; 60/226 R
[51] Int. Cl.² ...................... F16K 11/00; F02K 3.04; F02K 3/12
[58] Field of Search .......... 137/609, 625.46, 625.47, 137/608, 610, 611, 612, 612.1, 625.44, 625.45; 60/244; 415/153 A

[56] References Cited
UNITED STATES PATENTS

| | | | |
|---|---|---|---|
| 760,633 | 5/1904 | Kurzwernhart | 137/608 X |
| 1,169,448 | 1/1916 | Williams | 137/610 X |
| 1,405,900 | 2/1922 | Cassalette | 137/612 |
| 2,225,071 | 12/1940 | Meyerhoofer | 137/609 X |
| 3,147,773 | 9/1964 | Matthews et al. | 137/612 X |
| 3,319,656 | 5/1967 | Reader | 137/625.44 X |
| 3,331,394 | 7/1967 | Hefler et al. | 137/610 |
| 3,680,597 | 8/1972 | Obermaier | 137/609 X |
| 3,779,282 | 12/1973 | Klees | 60/226 R X |
| 3,792,584 | 2/1974 | Klees | 60/226 R X |
| 3,841,091 | 10/1974 | Sargisson | 60/224 |

Primary Examiner—Martin P. Schwadron
Assistant Examiner—Robert J. Miller
Attorney, Agent, or Firm—Vernon F. Hauschild

[57] ABSTRACT

An inverter valve arrangement which comprises a fixed forward duct system having concentric annular passages at its inlet and a fixed after duct system having concentric annular passages at its outlet and each fixed system having selectively shaped adjacent portions which are circumferentially displaced and joined by a plurality of flapper valves. The flapper valves may be actuated so that either series or parallel flow will occur between the concentric annular passages of the systems.

12 Claims, 12 Drawing Figures

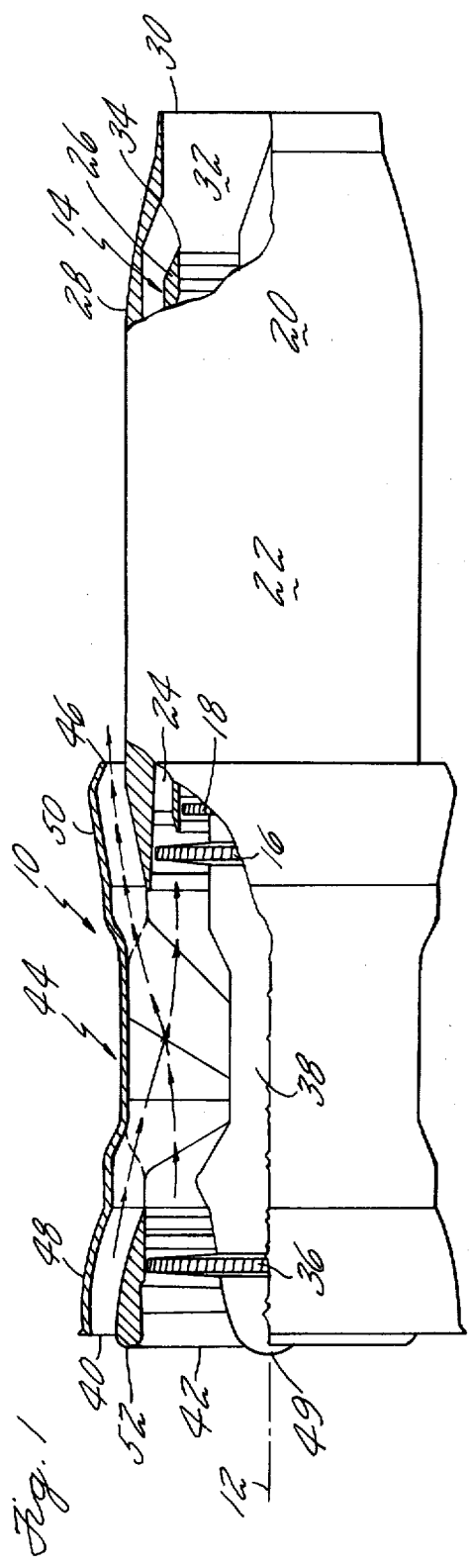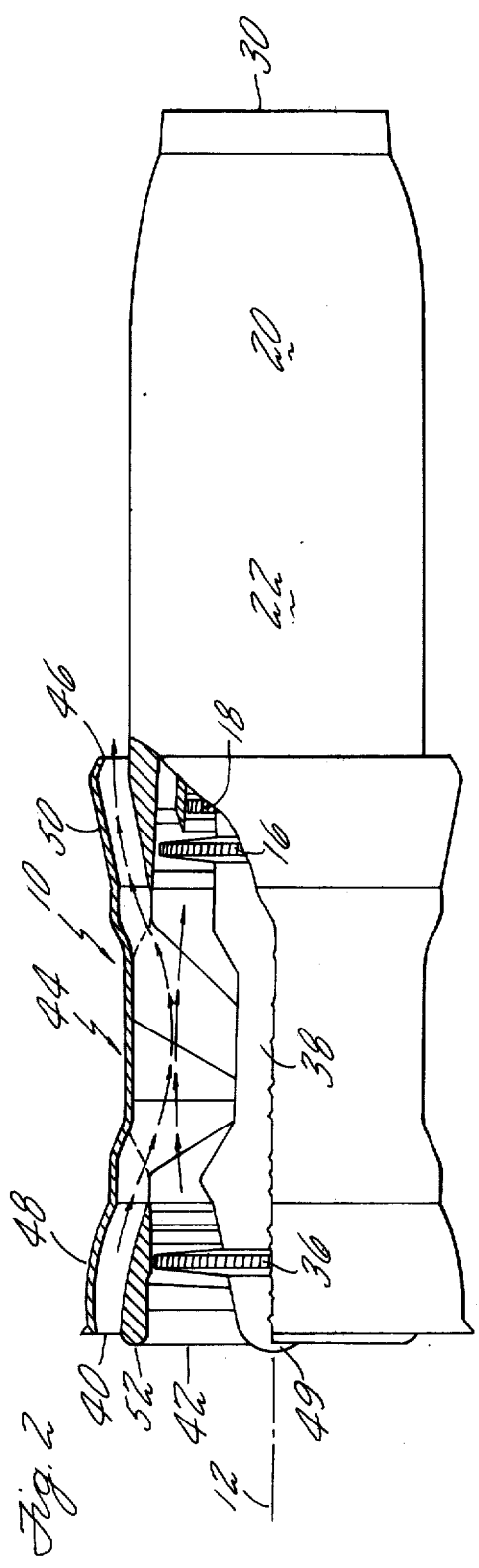

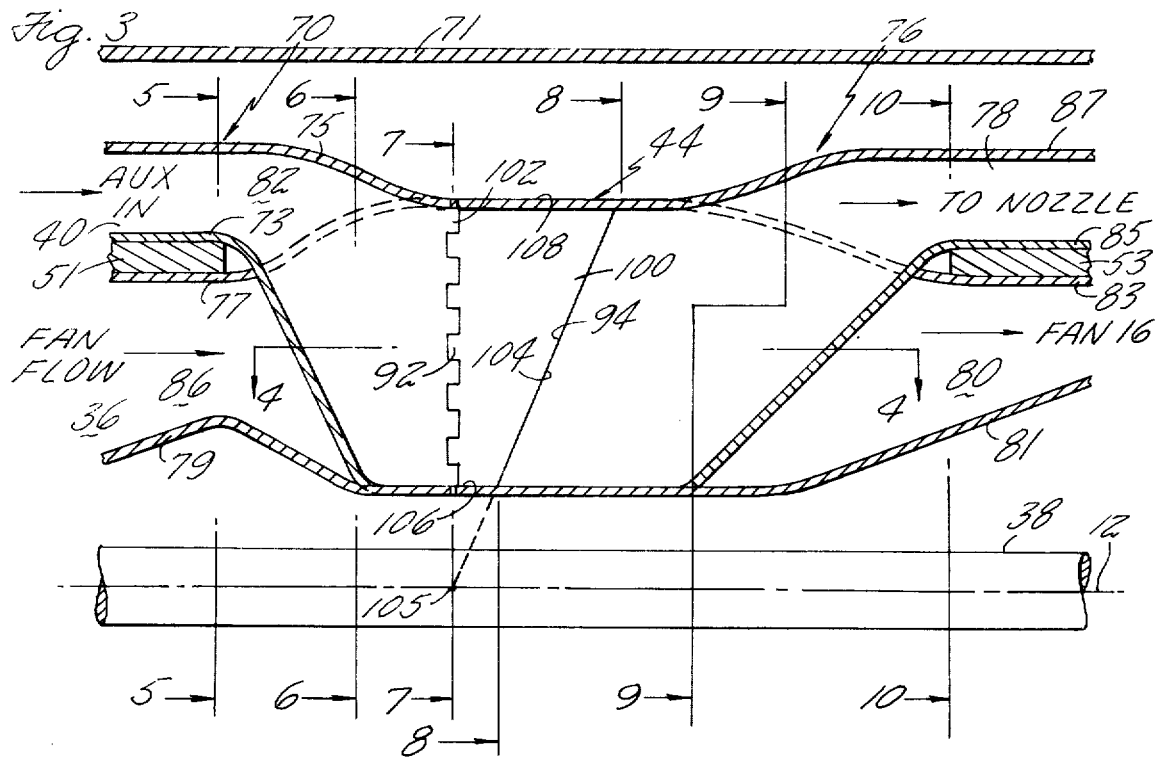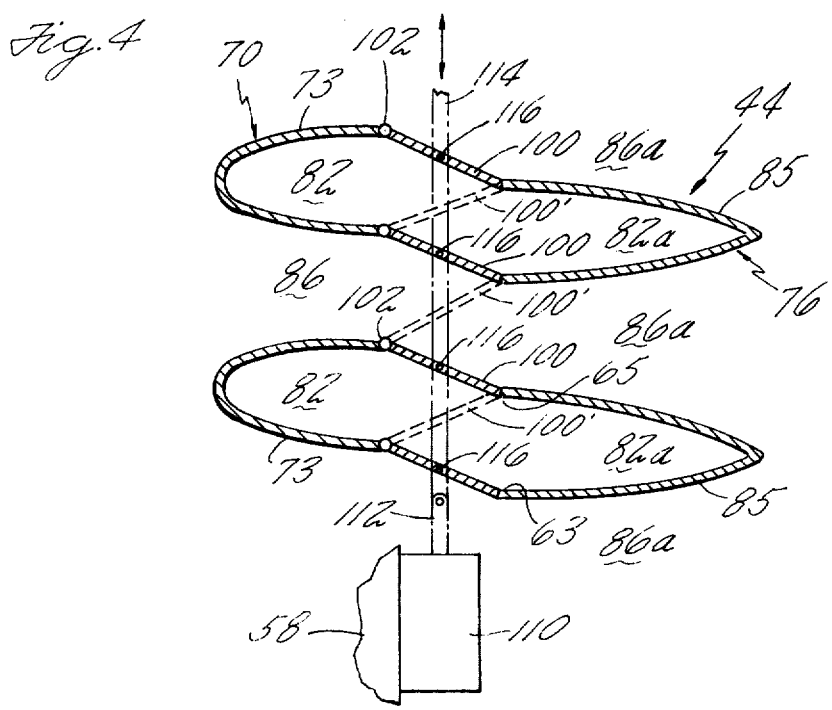

VARIABLE RATIO BYPASS GAS TURBINE ENGINE WITH FLOW DIVERTER

BACKGROUND OF THE INVENTION

1. Field of Invention

This invention relates to variable bypass ratio turbojet engines and particularly to such engines and inverter flow valving to be used therewith which is light weight in construction, includes a minimal number of moving parts and no large parts, and which gives maximum bypass ratio variation possibility.

2. Description of the Prior Art

The prior art includes bypass engines, such as that shown in Sobey U.S. Pat. No. 3,016,698; Hewson U.S. Pat. No. 3,368,352; however, attempts to effect variable ratio bypass engines have produced results which are not fully satisfactory. For example, the engine shown in Schumacher et al U.S. Pat. No. 3,514,952 has variable ratio potential but has the disadvantage that, like Sobey and Hewson, it lacks provision for an auxiliary inlet and hence are not suitable for converting from high bypass ratio to low bypass ratio mode. U.S. Pat. No. 3,792,584 also discloses a variable bypass ratio engine which is a substantial improvement over the prior art but which has the disadvantage that it includes at least one large part which must be successfully mounted for rotation and which must be movably actuatable despite substantial inertia resistance. The inverter valve of this construction must be coaxial with the engine and annular in shape and presents the problems, such as sealing, of any new configuration in which a large part must be mounted for motion in a foreign environment.

SUMMARY OF THE INVENTION

A primary object of the present invention is to provide a variable bypass ratio engine which has maximum flexibility of bypass ratio, which is light in construction, which includes no large movable parts and which includes a minimal number of movable parts.

It is a further object of this invention to teach such a bypass ratio engine in which the movable parts are aerodynamically balanced and hence may be actuated with minimal actuating force.

It is a further object of this invention to teach such an engine which operates at a high bypass ratio during take-of mode of operation and a low bypass ratio at cruise mode of operation.

It is still a further object of the present invention to teach such an engine which has an auxiliary inlet and an auxiliary nozzle, either or both of which may be variable in area and/or retractable.

It is still a further object of the present invention to teach such an engine which is constructed to produce minimum noise and maximum take-off and cruise prformance.

It is still a further object of this invention to teach such an engine which will present minimal internal and external drag by nesting the bypass arrangment into the engine construction and maintaining the flow passages throughout the entire length of the engine to maintain minimum flow losses.

It is still a further object of this invention to teach flow inversion mechanism which includes a plurality of individual flaps actuatable to effect flow inversion, which are easy to maintain and assemble, which present low inertia forces and hence permit rapid actuation, which present minimal fluid sealing problems, and which fall into the fully developed technology of variable area vanes.

It is still a further object of this invention to teach such a flow inversion mechanism which does not have to be of annular shape or coaxial with an engine or other device which it services and in which the flow passages do not have to be identical.

It is still a further object of the present invention to teach such a variable bypass engine which includes an inverter valve positioned between a forward fan and the core engine fan. The inverter valve consists of two fixed duct systems nested within the engine profile and including flow defining passages of substantially constant cross-sectional area and minimal flow turning requirements and which are connected to a valve arrangement so that the flow therethrough can be either inverted to produce a parallel flow arrangement or unaltered to produce a series flow arrangement.

It is still a further object to teach such an engine with an inverter valve in which the valve mechanism joining the fixed duct portions consists of a series of flapper valve passages or switches joined so that the pressure drop thereacross produces cancelling forces and therefore requires minimal actuating force.

It is still a further object to teach such an engine in which the design and operation of the basic core engine is minimally affected.

Other objects and advantages of the present invention may be seen by referring to the following description and claims, read in conjunction with the accompanying drawings.

BRIEF DESCRIPTION OF THE DRAWINGS

FIG. 1 is a showing of my variable bypass ratio engine, partly in cross section, shown in its take-off or parallel flow mode of operation which produces a high bypass ratio, minimal noise engine operating condition.

FIG. 2 shows my invention in the cruise or series flow mode of operation which produces a low bypass ratio, with minimal fuel consumption engine operating characteristics.

FIG. 3 is a cross-sectional showing through the inverter valve portion of my engine.

FIGS. 4 through 10 are cross-sectional showings through corresponding section line 4—4 through 10—10 of FIG. 3.

DESCRIPTION OF THE PREFERRED EMBODIMENT

Figure 6:
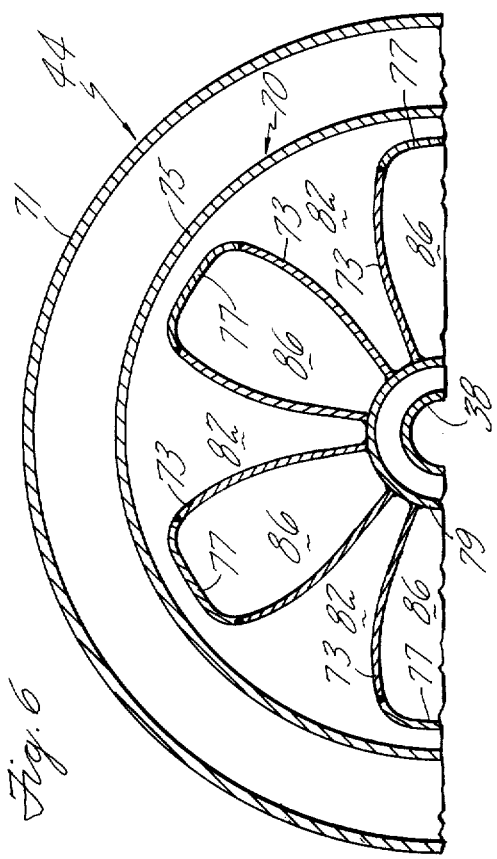

Referring to FIG. 1 we see my variable area bypass engine 10 in its take-off, high bypass ratio, parallel flow condition or mode of operation, and it should be remembered that FIG. 2 is the same engine in its cruise, low bypass ratio, series flow mode of operation. Engine 10 is preferably of circular cross section throughout its length and concentric about axis or centerline 12. Engine 10 consists of core engine 14 which has fan 16 mounted forward of compressor section 18. Turbine section 20 is connected in conventional fashion to drive fans 16 and 36 and compressor 18 and with combustion chamber section 22 positioned therebetween so that air which passes through fan 16 may pass either through fan annular passage 24, which is defined between engine case 26 and fan case 28 and from which it is discharged to atmosphere in thrust generating fashion through exhaust nozzle 30 after mixing with core engine exhaust gases in mixing chamber 32.

The remainder of the air passing through fan 16 passes through compressor section 18 to effect air compression, is then heated in passing through combustion section 22 and then has energy extracted therefrom in passing through turbine section 20 for driving fans 16 and 36 and compressor 18 before being discharged through core engine outlet 34 for mixing with fan air in mixing chamber 32 to be discharged therewith through engine outlet nozzle 30 to perform a thrust generating function. It should be noted that while a fixed outlet 30 is shown for the engine and the core engine, outlets 30 and 34 could as well be defined by variable area exhaust nozzles of conventional design. In addition, while fan passage 24 is shown without combustion taking place therein, combustion could well take place therein in conventional fashion and, a conventional afterburner (not shown) could be positioned downstream and operate in conventional fashion in conjunction with engine 10.

Front fan 36 is positioned axially forward of core engine 14 and driven thereby in conventional fashion by shafting 38. Auxiliary inlet 40 concentrically envelops fan 36 and front fan inlet 42, so that inlets 40 and 42 are concentric annular inlets about axis 12. Inverter valve 44 is positioned between core engine-nozzle unit 14–46 and the front fan unit 36–40, and serves to determine whether engine 10 is to be operated in a high bypass ratio, take-off mode shown in FIG. 1 wherein the air from auxiliary inlet 40 is directed to engine fan 16 and the air from front fan 36 is directed to exhaust nozzle 46 to establish parallel flow relationship with minimal noise generation. As described in greater particularity hereinafter, flow inverter valve 44 may be actuated to the position shown in FIG. 2 for low bypass ratio, minimal fuel consumption, cruise mode operation wherein the air from front fan 36 is passed to fan 16 of core engine 14 and the air from auxiliary inlet 40 is passed to thrust nozzle 46 in uninverted fashion to produce a series flow relationship.

It should be noted by viewing FIGS. 1 and 2 that the fan inlet 42 and auxiliary air inlet 40 form concentric annular passages upstream of inverter valve 44, while engine fan 16 passage and thrust nozzle 46 form concentric annular passages downstream of the inverter valve 44 and that inverter valve 44 extends axially therebetween and is of annular shape concentric about axis 12 and is smoothly aerodynamically nested between auxiliary inlet case 48 and exhaust nozzle case 50. This description of variable ratio bypass engine 10 is considered to be sufficient for the purpose of describing this invention and, since it is of otherwise conventional general design, will not be described further since it may be of the type and have the variations shown in greater particularity in U.S. Pat. No. 3,792,584.

Figure 11:
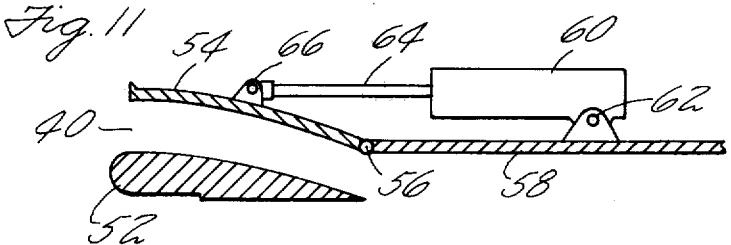
FIG. 11 corresponds to a portion of FIG. 1 but showing a variable area auxiliary inlet.
Figure 12:
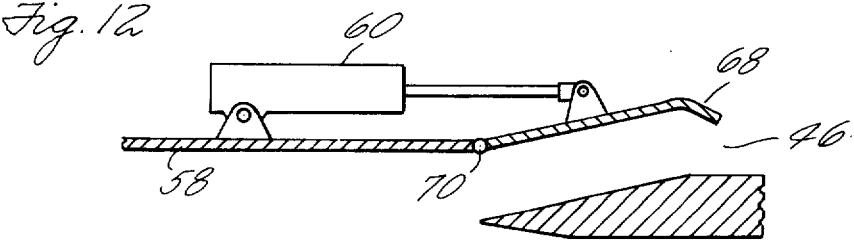
FIG. 12 corresponds to a portion of FIG. 1 but showing a variable area take-off nozzle.

While auxiliary inlet 40 and thrust nozzle 46 are shown to be of fixed geometry in FIGS. 1 and 2, it should be noted that they could well be of variable area geometry as shown in FIGS. 11 and 12, respectively. As best shown in FIG. 11, auxiliary inlet 40 is defined between front fan case 52, which cooperates with nose cone 49, as in FIGS. 1 and 2, to define fan inlet 42, and also cooperates with a plurality of overlapping flaps 54 to define auxiliary air inlet 40 to be of variable area.

Each of the overlapping flaps 54, which extend circumferentially about axis 12 are pivotally connected at pivot joint 56 to casing 58, which may be cases 75 or 87, of valve 44 and are actuated by prime mover 60, which could be an electric motor or a pneumatic or hydraulic power piston arrangement, connected in trunnion fashion at joint 62 to case 38 and actuatable to extend or retract rod member 64, which is pivotally connected to flap 54 at pivot point 66, so that due to the extension or retraction of rod member or member 64, overlapping flaps 54 are caused to pivot about their pivotal connections 56 to case 58 and vary the area of inlet 40.

In similar fashion, as shown in FIG. 12, exhaust nozzle 46 may be made of variable area by forming its outer wall as a series of overlapping flap member 68, which are pivotally connected at pivot joint 70 to stationary member 58, and may be actuated by the same type of mechanism 60 described in connection with FIG. 11 to vary the area of nozzle 46. While inlet 40 and outlet 46 are shown to be of variable area variety in FIGS. 11 and 12, it will be evident to those skilled in the art that they could also be made retractable by slidably connecting members 54 and 68 to fixed member 58 in sleeve fashion so that the action of actuators 60 would be to reatract or extend members 54 and 68.

Referring to FIGS. 3 through 10 we see my inverter valve 44 in greater particularity.

Referring to FIG. 3, we see that the forward end 70 of inverter valve 44, which may be enveloped within aircraft nacelle 71, is connected to auxiliary inlet 40 and front fan 36, which is located in annular passage 86.

It should be noted that the forward or front end 70 of valve 44 communicates with front fan annular passage 86 and auxiliary air inlet annular passage 82, whose forward end is defined by inlet 40. Passage 82 is defined between walls 73 and 75, while passage 86 is defined between walls 77 and 79 at station 5—5. It should be further noted that the after or downstream end or portion 76 of valve 44 communicates with annular passage 78, which terminates in nozzle 46, and with annular passage 80, which communicates with core engine fan 16. Passage 78 is defined between walls 87 and 85, while passage 80 is defined between walls 83 and 81 at station 10—10. It will further be noted that annular passages 82 and 78 are concentric with and surround annular passage 86 and 80, respectively, about engine axis 12.

Figure 5:
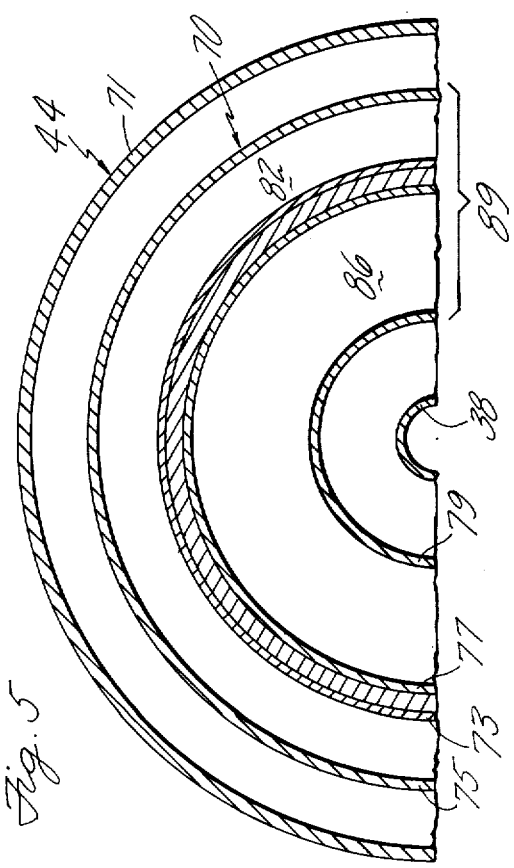
Figure 7:
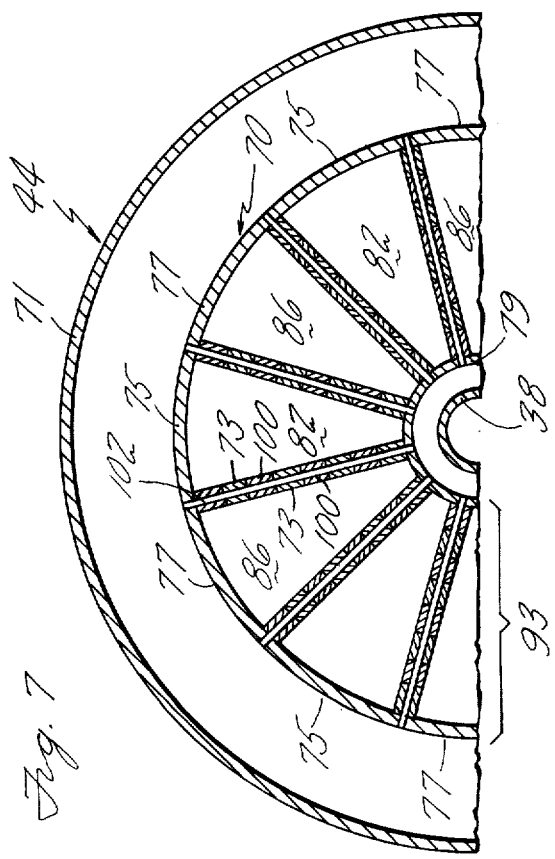

To maintain maximum flow efficiency through valve 44, it is important that the air passing therethrough pass through ducting which forms passages of substantially constant cross-sectional area throughout their axial lengths and which cause the direction of the fluid flow to change minimally. For this reason, the preferred embodiment of my valve 44 is shaped at annular inlet 89 of upstream portion 70 as shown in FIG. 5 to form two concentric and divided annular passages 82 and 86 and changes shape so that at station 6—6, as shown in FIG. 6, portion 70 comprises a plurality of separated passages 86 within walls 73 and 77 to communicate with annular passage 86 of FIG. 5. The walls 73–79 of passages 82 and 86 are preferably made of sheet metal, fiber glass or other suitable material, which walls cooperate to form the forward fixed portion 70 of valve 44, while similar wall members 81–87 cooperate to define after fixed portion 76 of valve 44. The walls which define passages 82 and 86 change in shape gradually while maintaining substantially constant cross-sectional area and with minimum fluid flow turning requirements, from the concentric annular shape shown in FIG. 5 to the petal shape of FIG. 6 and terminate at the after end 92 of fixed valve front portion 70 as a pluraltiy of substantially radially extending slots forming an outlet annulus 93 of alternate radially extending passages 82 and 86, which communicate with the correspondingly numbered passages of FIGS. 5 and 6 to form total passages 82 and 86.

Figure 8:
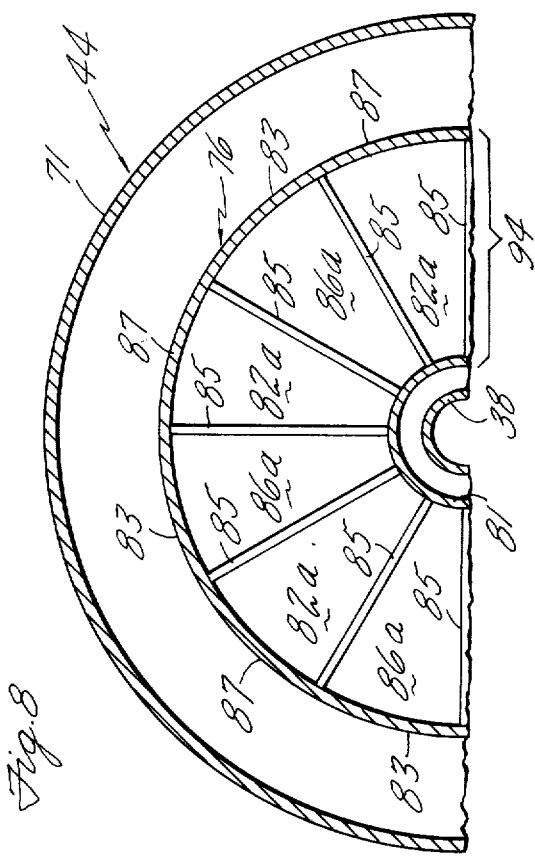
Figure 9:
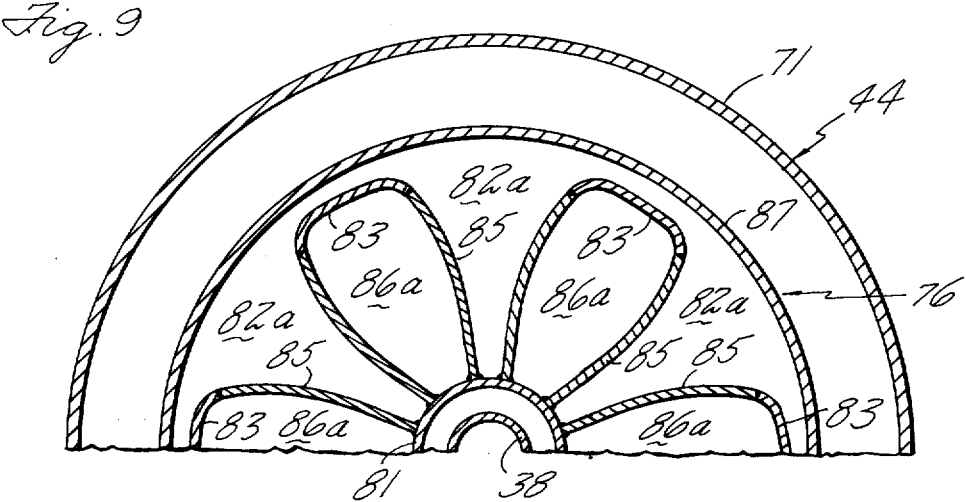
Figure 10:
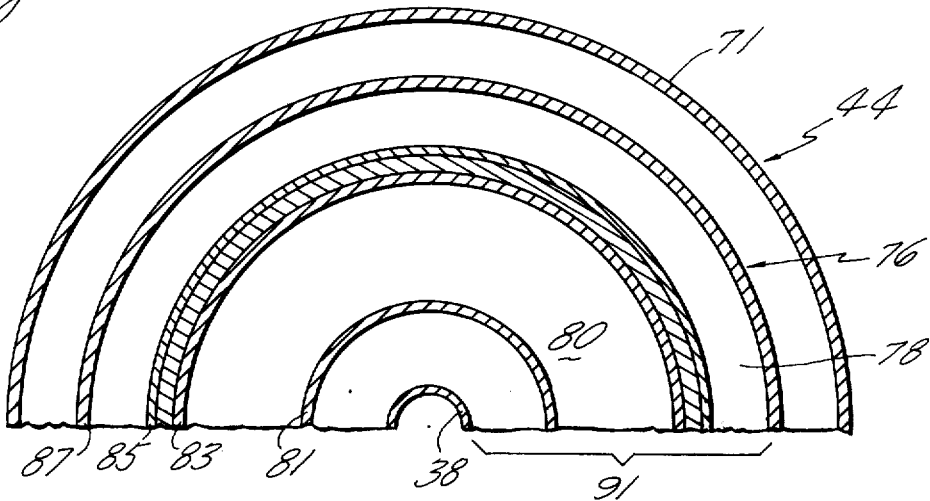

Valve afterfixed section 76 is fabricated and shaped similarly to valve forward section 70 and may be considered to be allochiral with respect thereto, except slightly circumferentially off-set with respect thereto as best shown in FIGS. 8 through 10. As best shown in FIG. 8, the upstream or inlet end 94 of valve portion 76 consists of a plurality of substantially radially extending and juxtapositioned passages 82a and 86a and which cooperate to define annular inlet 94 and whose wall defining members 81–87 may also be made of sheet metal, fiber glass, plastic or any other desired material. Walls 81–87 change gradually in shape in a downstream or after directon to define the petal shape passages 86a within walls 85 and 83 at station 9—9 shown in FIG. 9 and passages 82a between walls 85 and 87. Portion 76 then further changes shape in a downstream direction to define a downstream annular end or outlet 91 comprising an outer annulus 78 formed between walls 85 and 87 by cooperating and now merged passages 82a and an inner annulus 80 formed by cooperating and now merged passages 86a.

Valve portions 70 and 76 may be supported from supports 51 and 53, which are supported from engine 10.

It will accordingly be seen that inverter valve 44 is formed of a fixed forward portion 70 and a fixed after portion 76, with the forward portion 70 shaped at its forward end to define concentric annular inlet 89 including cooperating annular and concentric passages 82 and 86, respectively. Portion 70 is shaped at its annular outlet 93 to form a plurality of radially extending, alternate passages 82 and 86. Passages 82 and 86 pass through the shape transitions shown in FIGS. 5 through 7. Downstream portion 76 is shaped to define a series of radially extending, alternate passages 82a and 86a which cooperate to define annular inlet 94 and which change in shape gradually in a downstream direction to first form the petal shape of FIG. 9 and then the concentric annular outlets 78 and 80 which are defined by cooperating and now joined passages 82a and 86a, respectively. I have found that when passages 82 and 86 total 44 in number and when passages 82a and 86a total 44 in number, a convenient flow arrangement can be achieved.

Passages 82 and 86 are selectively connected to passages 82a and 86a, respectively, by the action of a plurality of flat flapper valves 100, preferably 44 in number, which are preferably pivotally connected along their forward edge to flap pivot hinge 102, and which are shaped to have a downstream edge 104, an inner edge 106, and an outer edge 108, the latter two of which are preferably substantially circular in shape and concentric about engine centerline 12 so as to transcribe a spherical arc portion thereabout when actuated and to sealingly engage corresponding spherical surfaces on walls 75 and 79. While flapper valves 100 are illustrated as pivotally connected to forward fixed portion 70, it will be evident to those skilled in the art that flapper valves 100 could as well have been pivotally connected to after fixed portion 76. Flap ends 106 and 108 may be flat and still actuatable with minimal clearance and preferably with conventional end travel sealing between ducts 75 and 79 and valves 100 without interference or binding during transition so long as the axis of hinge 102 and flap surface 104 intersect at engine axis 12, such as at 105. Flaps or flapper valve 100 are shown in their cruise mode of operation positions in FIG. 4 and are shown in phantom and designated as 100' in their take-off mode of operation in FIG. 4. It wIl be seen that with flaps 100 in their solid line or cruise mode of operation, passages 82 are joined to passages 82a, and passages 86 are joined to passages 86a, thereby placing engine 10 in the cruise mode of operation shown in FIG. 2. With flapper valves 100 shown in their phantom line position in FIG. 4, and designed as 100', they serve to place passages 82 into communication with passages 86a, while placing passages 86 into communication with passage 82a, thereby placing engine 10 in its take-off mode of operation shown in FIG. 1. As best illustrated in FIG. 4, another advantage of my inverter valve 44 is that flaps 100 present minimal sealing problems in that edges 106 and 108 can readily seal with the corresponding surfaces of portion 70, while the flap trailing edge 104 can readily seal with surface 63 of member 85 when in its full line FIG. 4 position and with surface 65 of member 85 when in its phantom line FIG. 4 position.

While not so necessarily so limited, passages 82, 82a, 86 and 86a may be shaped as more fully disclosed and described in U.S. Pat. No. 3,779,282.

Flapper valves 100 are preferably actuated by a prime mover 110 shown in FIG. 4, which may be an electric motor, a pneumatic or hydraulic cylinder-piston arrangement or any other type of conventional actuating device, which is preferably located on valve casing 58 and which causes actuating rod 112 to reciprocate and act through ring or circular strap member 114, which is pivotally connected to each flap 100 at pivot points such as 116, to cause the flaps to move in unison through an arc about their flap hinges 102 between their solid line cruise mode positions indicated at 100 in FIG. 4 and their phantom line take-off mode positions designed as 100' in FIG. 4. The advantage of having all flapper valves 100 actuated simultaneously through an interconnected actuation system is that the pressure drop forces across each flap 100 cancels and thereby permits valve actuation with a minimum of actuation force.

I wish it to be understood that I do not desire to be limited to the exact details of construction shown and described, for obvious modifications will occur to a person skilled in the art.

I claim:

1. An annular inverter valve system for inverting the flow relationship between two annularly flowing fluid streams comprising:
    A. a fixed, annularly shaped upstream member shaped to define:
        1. a first duct system having a first annular inlet and a first outlet comprising a plurality of radially extending and circumferentially spaced outlets communicating with said first inlet,
        2. a second duct system having a second annular inlet concentrically enveloping said first annular inlet to cooperate therewith in defining an annular inlet for said upstream member and a second outlet comprising a plurality of radially extending and circumferentially spaced outlets communicating with said second inlet and arranged alternately with said first outlets to define an annular outlet for said upstream member, B. a fixed, annularly shaped downstream member positioned axially downstream in spaced relation to said upstream member and shaped to define:
 1. a third duct system having a third inlet comprising a plurality of radially extending and circumferentially spaced inlets and a third annular outlet communicating with said third inlets,
 2. a fourth duct system having a fourth inlet comprising a plurality of radially extending and circumferentially spaced inlets arranged alternately with said third inlets to define an annular inlet for said downstream member and communicating with a fourth annular outlet concentrically enveloping said third annular outlet and cooperating therewith in defining an annular outlet for said downstream member, C. said fixed downstream member being positioned with respect to said fixed upstream member such that said downstream member third and fourth inlets are circumferentially offset with respect to said upstream member first and second outlets, and D. a plurality of substantially radially oriented, flat flapper valves actuatable to join the outlets of said first duct system to the inlets of said fourth duct system while the outlets of said second duct system are joined to the inlets of said third duct system when said flapper valves are in a first position, and actuatable to a second position wherein the outlets of said first duct system are joined to the inlets of said third duct system while the outlets of said second duct system are joined to the inlets of said fourth duct system.

2. A valve system according to claim 1 wherein said upstream and said downstream menbers are shaped so that the cross-sectional area of said duct systems are substantially constant and so that the passages defined therethrough are substantially axial.

3. A valve system according to claim 2 wherein said annular inlet and annular outlet of said upstream and downstream members lie in axially spaced planes, are concentric about the axis of the inverter valve system, and are of substantially equal cross-sectional areas.

4. A valve system according to claim 1 wherein said downstream member is shaped to be allochiral with respect to said upstream member.

5. An annular inverter valve system for inverting the flow relationship between two annularly flowing fluid streams comprising:

A. a fixed, annularly shaped upsteam member shaped to define:
 1. a first duct system shaped to define a first annular inlet and a firsrt outlet communicating with said first inlet through selectively shaped ducting so that the total passage formed by the first duct system is of substantially constant cross-sectional area between its inlet and outlet,
 2. a second duct system shaped to define a second annular inlet concentrically enveloping said first annular inlet to cooperate therewith in defining an annular inlet for said uptstream member and a second outlet communicating with said second inlet through selectively shaped ducting so that the total passage formed by the second duct system is of substantially constant cross-sectional area between its inlet and outlet and cooperating with said first outlet to define an annular outlet for said upstream member, B. a fixed, annularly shaped downstream member positioned axially downstream in spaced relation to said upstream member and shaped to define:
 1. a third duct system shaped to define a third inlet and a third annular outlet communicating with said third inlet through selectively shaped ducting so that the total passage formed by the third duct system is of substantially constant cross-sectional area between its inlet and outlet,
 2. a fourth duct system shaped to define a fourth inlet cooperating with said third inlet to define an annular inlet for said downstream member and a fourth annular outlet concentrically enveloping said third annular outlet and cooperating therewith in defining an annular outlet for said downstream member and with said fourth outlet communitcating with said fourth inlet through selectively shaped ducting so that the total passage formed by the fourth duct system is of substantially constant cross-sectional area between its inlet and outlet, C. a plurality of flat flapper valves actuatable to join the outlet of said first duct system to the inlet of said fourth duct system while the outlet of said second duct system is joined to the inlet of said third duct system when said flapper valves are in a first position, and actuatable to a second position wherein the outlet of said first duct system is joined to the inlet of said third duct system while the outlet of said second duct system is joined to the inlet of said fourth duct system.

6. A valve system according to claim 5 wherein said upstream and said downstream members are shaped so that their total cross-sectional area are substantially constant along their axis and so that the passages defined therethrough are substantially axial.

7. A valve system according to claim 6 wherein said annular inlet and annular outlet of said upstream and downstream members lie in axially spaced planes, and are concentric about the axis of the inverter valve system.

8. A valve system according to claim 5 wherein said downstream member is shaped to be allochiral with respect to said upstream member.

9. A valve system according to claim 5 wherein said first and second outlets and said third and fourth inlets are radially extending, wherein said downstream member is circumferentially offset with respect to said upstream member, and wherein said flapper valves are substantially radially extending and pivotally connected to one of said members for circumferential, pivotal actuation thereabout.

10. A flow control system for inverting two flow patterns within a longitudinally extending annular fluid passageway comprising separate first and second duct means having adjacent annular cross sections at the entrance end and the exit end of said passageway and having a combined total cross-sectional area substantially equal to the cross-sectional area of said annular fluid passageway; wherein the entrance cross section of said first duct means is concentric with and surrounds the entrance cross section of said second duct means; and wherein said first and second duct means are shaped and arranged to invert the flow pattern such that the exit cross section of said second duct means is concentric with and surrounds the exit cross section of said first duct means, thereby discharging two separate flow patterns at the exit end of said passageway in an annular adjacent relationship which is inverted from that existing at said entrance end of said annular fluid passageway; wherein said first and second duct means are fixed, and valve means comprising a plurality of flat, flapper valves actuatable to establish the inverted flow patterns or to join the entrance of said first duct means with the exit of said second duct means while the entrance of said second duct means is joined to the exit of said first duct means to thereby establish uninverted flow patterns.

11. A valve system according to claim 1 wherein each flapper valve leading edge is pivotally supported about an axis which intersects a line passing along the flapper valve trailing edge at the valve system axis and wherein each flapper valve is shaped to generate an arc of a frustoconical solid of revolution as it moves in pivotal motion.

12. A valve system according to claim 5 wherein each flapper valve leading edge is pivotally supported about an axis which intersects a line passing along the flapper valve trailing edge at the valve system axis and wherein each flapper valve is shaped to generate an arc of a frustoconical solid of revolution as it moves in pivotal motion.

* * * * *